United States Patent
Jung et al.

(10) Patent No.: US 10,941,249 B2
(45) Date of Patent: Mar. 9, 2021

(54) METHOD OF PREPARING POLYPHENYLENE SULFIDE AND HIGH-VISCOSITY POLYPHENYLENE SULFIDE PREPARED USING THE SAME

(71) Applicant: LG CHEM, LTD., Seoul (KR)

(72) Inventors: Kwonsu Jung, Daejeon (KR); Joong Jin Han, Daejeon (KR); Eun Ju Park, Daejeon (KR); Hyun Woog Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 16/320,420

(22) PCT Filed: Nov. 14, 2017

(86) PCT No.: PCT/KR2017/012865
§ 371 (c)(1),
(2) Date: Jan. 24, 2019

(87) PCT Pub. No.: WO2018/117426
PCT Pub. Date: Jun. 28, 2018

(65) Prior Publication Data
US 2020/0181330 A1 Jun. 11, 2020

(30) Foreign Application Priority Data

Dec. 23, 2016 (KR) .......................... 10-2016-017795
Oct. 25, 2017 (KR) ........................ 10-2017-0139054

(51) Int. Cl.
C08G 75/14 (2006.01)
C08K 5/00 (2006.01)

(52) U.S. Cl.
CPC ............ *C08G 75/14* (2013.01); *C08K 5/0025* (2013.01)

(58) Field of Classification Search
CPC ................ C08G 75/14; C08G 75/0263; C08G 75/0268; C08G 75/0259; C08G 75/025; B30B 9/28
See application file for complete search history.

(56) References Cited

U.S. PATENT DOCUMENTS

| | | | |
|---|---|---|---|
| 4,415,729 A | 11/1983 | Scoggins et al. | |
| 4,631,336 A | 12/1986 | Idel et al. | |
| 5,266,680 A | 11/1993 | Reed | |
| 2011/0178268 A1* | 7/2011 | Suzuki ............... | C08G 75/0254 528/388 |
| 2016/0068636 A1 | 3/2016 | Suzuki et al. | |

(Continued)

FOREIGN PATENT DOCUMENTS

| | | |
|---|---|---|
| JP | 61-47732 A | 3/1986 |
| JP | 2002-265604 A | 9/2002 |
| JP | 2008-231140 A | 10/2008 |

(Continued)

*Primary Examiner* — Shane Fang
(74) *Attorney, Agent, or Firm* — Dentons US LLP

(57) ABSTRACT

The present invention relates to a method of preparing a polyphenylene sulfide and a high-viscosity polyphenylene sulfide prepared using the method. In this method, the ratio of an organic phase to an aqueous phase is controlled by controlling dehydration conditions, so that high viscosity may be realized without adversely affecting a reaction or physical properties during preparation of the polyphenylene sulfide.

9 Claims, 1 Drawing Sheet

(56) References Cited

U.S. PATENT DOCUMENTS

2017/0137573 A1* 5/2017 Suzuki ............... C08G 75/0213

FOREIGN PATENT DOCUMENTS

| JP | 2008-231251 A | 10/2008 |
| JP | 2016-056232 A | 4/2016 |
| KR | 1020010044212 A | 6/2001 |
| KR | 1020130025015 A | 3/2013 |
| KR | 1020150026541 A | 3/2015 |

* cited by examiner

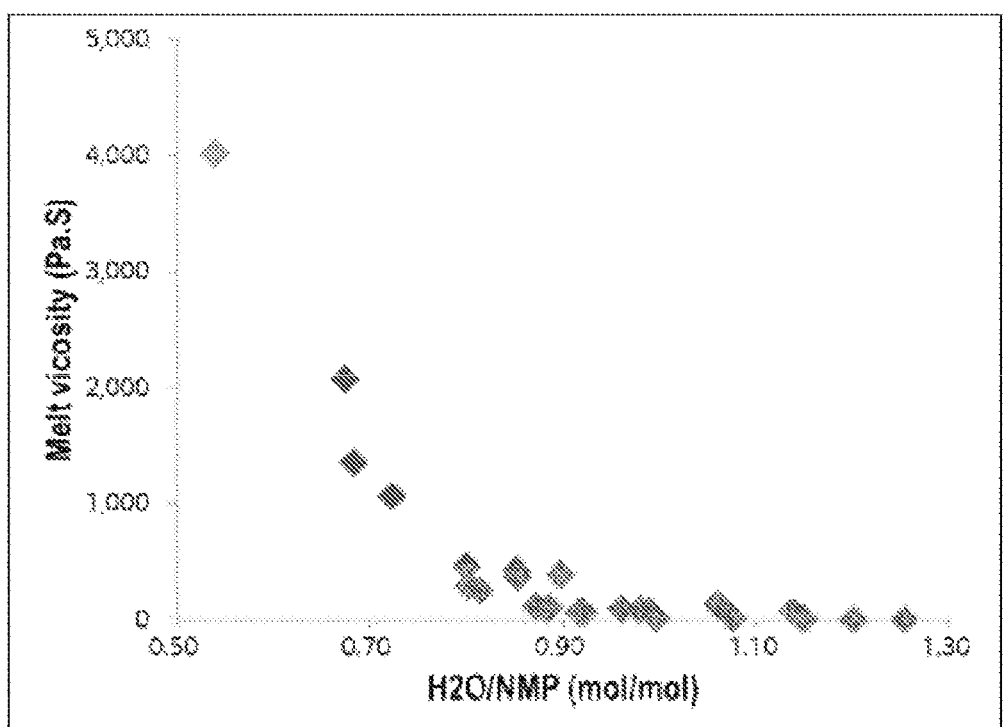

METHOD OF PREPARING POLYPHENYLENE SULFIDE AND HIGH-VISCOSITY POLYPHENYLENE SULFIDE PREPARED USING THE SAME

CROSS-REFERENCE TO RELATED APPLICATIONS

This application is a national stage of international application No. PCT/KR2017/012865, which claims priority to Korean Patent Application No. 10-2016-0177955, filed on Dec. 23, 2016, and Korean Patent Application No. 10-2017-0139054, re-filed on Oct. 25, 2017, based on the priority of the above patent application, in the Korean Intellectual Property Office, the disclosures of each of which are incorporated herein by reference in their entirety.

TECHNICAL FIELD

Cross-Reference to Related Applications

This application claims priority to Korean Patent Application No. 10-2016-0177955, filed on Dec. 23, 2016, and Korean Patent Application No. 10-2017-0139054, re-filed on Oct. 25, 2017, based on the priority of the above patent, in the Korean Intellectual Property Office, the disclosures of each of which are incorporated herein by reference.

The present invention relates to a method of preparing a polyphenylene sulfide and a high-viscosity polyphenylene sulfide prepared using the method. More particularly, the present invention relates to a method of preparing a polyphenylene sulfide, in which melt viscosity and a molecular weight range required for fluidity are realized during preparation of the polyphenylene sulfide, and to a high-viscosity polyphenylene sulfide prepared using the method.

BACKGROUND ART

Recently, there has been increasing demand for using thermoplastic resins having high heat resistance and excellent chemical resistance as materials for components used in electric/electronic devices and chemical devices. For example, polyphenylene sulfide (PPS), a thermoplastic resin, has excellent strength, heat resistance, flame retardancy, and processability, and is therefore attracting attention as a substitute for die-cast metals, such as aluminum and zinc, used in automobiles, electric/electronic products, machinery, and the like. By controlling the molecular weights and molecular weight distributions of polyphenylene sulfides in a polymerization process, polyphenylene sulfide resins having various flow properties may be prepared.

From the viewpoint of flow properties, when melt viscosity is too low, the mechanical strength of a resin composition is weakened. On the other hand, when melt viscosity is too high, the fluidity of the resin composition becomes poor during melt molding, which makes a molding operation difficult.

However, in preparation of a polyphenylene sulfide, it is difficult to control a polymerization process so that the polyphenylene sulfide has appropriate melt viscosity satisfying both mechanical strength and moldability. Therefore, there is a need to develop a preparation method capable of overcoming the above problems.

PRIOR ART DOCUMENT

[Patent Document] (Patent Document 1) KR 10-2013-0025015 A

DISCLOSURE

Technical Problem

Therefore, the present invention has been made in view of the above problems, and it is one object of the present invention to provide a method of preparing a high-viscosity polyphenylene sulfide, in which dehydration conditions are controlled during a preparation process, and the ratio of an organic phase to an aqueous phase is adjusted to prepare a high-viscosity polyphenylene sulfide.

It is another object of the present invention to provide a high-viscosity polyphenylene sulfide having specific melt viscosity and a specific molecular weight range.

The above and other objects can be accomplished by the present disclosure described below.

Technical Solution

In accordance with one aspect of the present invention, provided is a method of preparing a polyphenylene sulfide, including
(a) a step of forming a mixture of a sulfur source, an alkali metal hydroxide, a polymerization agent, an organic solvent, and water;
(b) a step of heating the mixture while stirring to obtain a residual mixture; and
(c) a step of adding a dihalogenated aromatic compound and an organic solvent to the residual mixture to obtain a mixed solution, and polymerizing the mixed solution,
wherein, the molar ratio of water to the organic solvent ($H_2O$/organic solvent) in the mixed solution of step (c) is 0.5 to 0.85.

In accordance with another aspect of the present invention, provided is a high-viscosity polyphenylene sulfide, wherein the melt viscosity of the polyphenylene sulfide measured using an Advanced Rheometric Expansion System G2 (ARES-G2) is 150 to 15,000 Pa·s.

Advantageous Effects

As apparent from the foregoing, the present invention advantageously provides a method of preparing a polyphenylene sulfide and a high-viscosity polyphenylene sulfide prepared using the method. According to the method of the present invention, high viscosity desired in automobiles, electric/electronic products, or machinery can be realized during preparation of a polyphenylene sulfide. In addition, since the high-viscosity polyphenylene sulfide can be produced easily and in a simple manner, cost and time required for a process can be reduced and efficiency can be maximized. Specifically, according to the method of the present invention, when the polyphenylene sulfide is prepared, dehydration conditions are controlled to adjust the ratio of an organic phase to an aqueous phase, so that high viscosity can be realized without adversely affecting a reaction or physical properties during preparation of the polyphenylene sulfide. Therefore, the high-viscosity polyphenylene sulfide of the present invention can be widely used as a resin.

DESCRIPTION OF DRAWINGS

The FIGURE is a scatter plot showing the relationship between the molar ratio of $H_2O$/organic solvent in step (c)

and melt viscosity (MV, Angular frequency 0.1 rad/s, 300, Pa·s), which shows the difference between the polyphenylene sulfide prepared by the method of the present invention and a polyphenylene sulfide prepared by a conventional method.

BEST MODE

Hereinafter, the present invention will be described in detail.

The method of preparing a polyphenylene sulfide according to the present invention includes:

(a) a step of forming a mixture of a sulfur source, an alkali metal hydroxide, a polymerization agent, an organic solvent, and water;

(b) a step of heating the mixture while stirring to obtain a residual mixture; and (c) a step of adding a dihalogenated aromatic compound and an organic solvent to the residual mixture to obtain a mixed solution, and polymerizing the mixed solution, wherein the molar ratio of water to the organic solvent ($H_2O$/organic solvent) in the mixed solution of step (c) is 0.5 to 0.85.

In step (a), a mixture of a sulfur source, an alkali metal hydroxide, a polymerization agent, an organic solvent, and water is formed.

The sulfur source is not particularly limited so long as it is a solid sulfur source, and may be, for example, formed by reacting an alkali metal hydrosulfide and an alkali metal hydroxide. As a specific example, the sulfur source may be sodium hydrogen sulfate, sodium sulfide, potassium sulfide, or the like. When an alkali metal hydrosulfide, such as sodium hydrogen sulfate, is used as the sulfur source, the alkali metal hydrosulfide reacts with an alkali metal hydroxide to form an alkali metal sulfide.

For example, sodium hydroxide (NaOH), a strong basic alkali metal hydroxide, reacts with sodium hydrosulfide (NaSH) to generate water and sodium sulfide ($Na_2S$), and the resulting sodium sulfide can react with p-dichlorobenzene.

The polymerization agent is a substance capable of increasing the polymerization degree of a polyphenylene sulfide in a short time by promoting polymerization reaction, and may be, for example, one or more selected from the group consisting of an organic acid metal salt, an alkali metal chloride, an organic sulfonate, and an alkali metal sulfate, preferably a slightly acidic organic acid metal salt, more preferably sodium acetate.

In the present description, the description that the organic acid metal salt may be a slightly acidic organic acid metal salt is intended to explain that the organic acid metal salt may be slightly acidic species, and the organic acid metal salt is not limited to slightly acidic species.

Sodium hydroxide (NaOH) as a strong basic alkali metal hydroxide may be used in amount of 0.8 to 1.5 equivalents or 1.0 to 1.2 equivalents with respect to 1 equivalent of sodium hydrosulfide (NaSH), a sulfur source. Within this range, the viscosity of a polyphenylene sulfide may be improved.

In the present description, the description that the alkali metal hydroxide may be a strong basic alkali metal hydroxide is intended to explain that the alkali metal hydroxide may be strong basic species, and the alkali metal hydroxide is not limited to strong basic species.

Unless defined otherwise in this specification, slight acidity refers to a pH of 5 to 6, and strong basicity refers to a pH of 10 or greater.

The organic solvent may be a polar solvent for dissolving each raw material, and may be, for example, one or more selected from an alcohol, an alkylene oxide, n-methylpyrrolidone (NMP), and a polyhydric alcohol. As a specific example, the organic solvent is preferably an organic amide solvent which is an aprotic polar organic solvent stable to an alkali at a high temperature. More preferably, n-methylpyrrolidone (NMP), an organic solvent, is be dehydrated and then mixed with a dihalogenated aromatic compound to be used as the organic solvent.

When the organic solvent is used in combination with distilled water, ring-opening reaction may occur at a high temperature in a reactor to form sodium 4-(N-methylamino)-butanoate. In this case, when a sulfur source is dissolved, side reaction, in which a $H_2S$ gas is generated, may be suppressed. Thus, it is preferable that the organic solvent is mixed with distilled water and used as a mixed solvent. With respect to 1 equivalent of sodium hydrosulfide (NaSH) as a sulfur source, the organic solvent may be used in a range of 1.0 to 5.0 equivalents or 1.5 to 2.0 equivalents, and water may be used in a range of 1.0 to 15.0 equivalents or 4.0 to 10.0 equivalents.

For example, the equivalence ratio of the polymerization agent (WM) to the sulfur source (S) in step (a), i.e., WM/S, may be 0.05 to 1.0, 0.1 to 0.8, or 0.3 to 0.5. Within this range, viscosity may be improved.

Next, in step (b), water is removed from the mixture to obtain a residual mixture. For example, the residual mixture may be generated by reaction of water, a sulfur source, and an alkali metal hydroxide.

The mixture may be heated to a temperature of 130 to 210° C., 150 to 205° C., 180 to 205° C., or 180 to 190° C. and stirred to remove water. Within this range, a portion of the organic solvent is removed together with water, it is possible to obtain a residual mixture which allows the high-viscosity of a finally obtained polyphenylene sulfide containing sulfur in a specific amount or more to be flexibly controlled.

For example, in the residual mixture, 70 to 90% by weight of the organic solvent may remain.

When the residual mixture obtained in step (b) is measured by gas chromatography, the molar ratio of water to sulfur ($H_2O$/S) may be 1.0 or more, or 1.5 or more, preferably 1.7 to 3.0, more preferably 1.7 to 2.5. Within this range, it is possible to flexibly increase the high-viscosity of the resulting polyphenylene sulfide by raising the residual amount of water without adversely affecting the reaction.

Next, in step (c), a dihalogenated aromatic compound and an organic solvent are added to the residual mixture, and polymerization is performed.

The dihalogenated aromatic compound may be various kinds of compounds, and may be, for example, one or more selected from polyhalogenated aromatic compounds consisting of p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene. Thereamong, para-dihalogenbenzene capable of introducing a halogen end group, specifically a chlorine end group, into a polyphenylene sulfide is preferable. In addition, the dihalogenated aromatic compound may be a single compound or a mixture of two or more compounds.

For example, the equivalence ratio of the sulfur source (S) used in step (a) to the dihalogenated aromatic compound (DH), i.e., S/DH, may be 0.80 to 1.30, 0.90 to 1.10, or 0.95 to 1.05. Within this range, halogen end substituents may be sufficiently provided within a range suitable for imparting high viscosity.

For example, the organic solvent may be used in a range of 0.5 to 5.0 equivalents, 1.0 to 2.0 equivalents, or 1.5 to 2.0 equivalents with respect to 0.99 equivalents of para-dichlorobenzene (p-DCB) as a dihalogenated aromatic compound.

For example, the polymerization may be performed by heating the mixed solution to a temperature of 200 to 280° C. and stirring the mixed solution. For the polymerization, for example, the mixed solution may be heated to a temperature of 200 to 280° C. and stirred. When necessary, the mixed solution may be heated to a temperature of 200 to 240° C. and reacted, and then, heated to a temperature of 240 to 280° C. and stirred. That is, stirring may be performed in multiple stages. In addition, after heating, with respect to 0.99 equivalents of para-dichlorobenzene (p-DCB) as a dihalogenated aromatic compound, distilled water may be added in a range of 1.0 to 7.0 equivalents, 2.0 to 6.0 equivalents or 2.0 to 4.0 equivalents to rapidly cool the reaction, so that phase separation occurs and a polyphenylene sulfide is obtained.

When the mixed solution obtained by adding the dihalogenated aromatic compound and the organic solvent to the residual mixture in step (c) is subjected to gas chromatography analysis to measure the amounts of water and the organic solvent, the molar ratio of $H_2O$/organic solvent may be 0.5 to 0.85, 0.5 to 0.80, 0.5 to 0.75, or 0.54 to 0.68. Within this range, the viscosity of a polyphenylene sulfide contained in an organic phase may be increased by effectively controlling the residual amount of the organic solvent.

Through this process, a polyphenylene sulfide obtained in a solid form may be provided at a high viscosity. At this step, a polyphenylene sulfide having a structure represented by Formula 1 below may be provided:

[Formula 1]

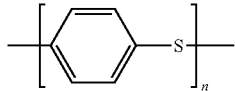

wherein n is an integer greater than or equal to 10, or 10 to 10,000.

The main chain in Formula 1 is shown as an example, and the polyphenylene sulfide resin according to the present invention may have, for example, various main chain structures selected from the group consisting of copolymer units having structures represented by Formula 2 below.

[Formula 2]

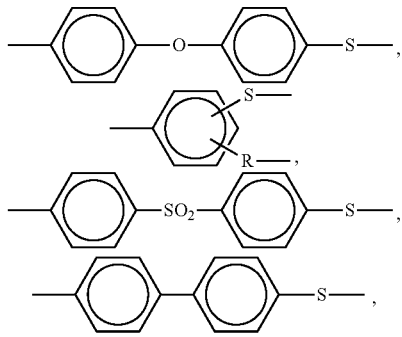

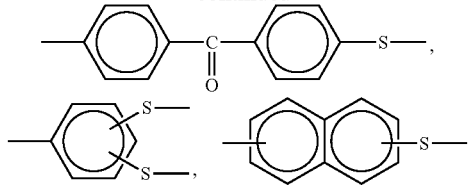

The polyphenylene sulfide of Formula 1 may be obtained through conventional purification and filtration processes. For example, the following processes may be sequentially performed: washing is sequentially performed using a mixture of water and the organic solvent and water, followed by filtration; washing is performed at 90 to 100° C. for 5 to 20 minutes using the organic solvent, followed by filtration; washing is performed at 90 to 120° C. or 90 to 100° C. using 0.1 to 1% by weight of an aqueous solution of acetic acid, followed by filtration; and washing is performed several times at 90 to 100° C. for 5 to 20 minutes using water, followed by filtration.

In addition, the present invention provides a high-viscosity polyphenylene sulfide, wherein the melt viscosity of the polyphenylene sulfide measured using an Advanced Rheometric Expansion System G2 (ARES-G2) under conditions of a temperature of 300° C. and a rate of 0.1/s may be, for example, 150 to 15,000 Pa·s, 300 to 10,000 Pa·s, 350 to 7,000 Pa·s, 450 to 5,000 Pa·s, 1,000 to 5,000 Pa·s, or 1,000 to 4,500 Pa·s.

For example, the molecular weight of the high-viscosity polyphenylene sulfide indirectly calculated using a melt viscosity of 0.1 rad/s may be 30,000 g/mol or more, 30,000 to 100,000 g/mol, 30,000 to 80,000 g/mol, 34,000 to 70,000 g/mol, 40,000 to 70,000 g/mol, or 50,000 to 70,000 g/mol. Within this range, the processability and productivity of the polyphenylene sulfide having thermal properties may be excellent.

The high-viscosity polyphenylene sulfide may be used as a substitute for metals used in automobiles, electric/electronic products, machinery.

As described above, according to the method of preparing a polyphenylene sulfide according to the present invention, a high-viscosity polyphenylene sulfide may be efficiently prepared by controlling the ratio of an organic phase to an aqueous phase without adversely affecting reaction or the physical properties of the polyphenylene sulfide during preparation of the polyphenylene sulfide.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

In step (a), sodium hydrosulfide (NaSH) and sodium hydroxide (NaOH) were mixed at an equivalence ratio of 1:1.05 to prepare sodium sulfide. At this time, 0.33 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.34.

In step (c), to obtain a mixed solution, 0.99 equivalents of para-dichlorobenzene (p-DCB) and 1.65 equivalents of N-methyl-2-pyrrolidone (NMP) were added to the residual mixture in the reactor without lowering the temperature. In this case, the molar ratio of $H_2O/NMP$ measured by gas chromatography was 0.80.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Example 2

In step (a), sodium hydrosulfide (NaSH) and sodium hydroxide (NaOH) were mixed at an equivalence ratio of 1:1.05 to prepare sodium sulfide. At this time, 0.44 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.14.

In step (c), to obtain a mixed solution, 0.99 equivalents of para-dichlorobenzene (p-DCB) and 1.65 equivalents of N-methyl-2-pyrrolidone (NMP) were added to the residual mixture in the reactor without lowering the temperature. In this case, the molar ratio of $H_2O/NMP$ measured by gas chromatography was 0.72.

Thereafter, the mixed solution was heated to 230° C. and reacted for 2 hours; heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Example 3

In step (a), sodium hydrosulfide (NaSH) and sodium hydroxide (NaOH) were mixed at an equivalence ratio of 1:1.05 to prepare sodium sulfide. At this time, 0.44 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.34.

In step (c), to obtain a mixed solution, 0.99 equivalents of para-dichlorobenzene (p-DCB) and 1.65 equivalents of N-methyl-2-pyrrolidone (NMP) were added to the residual mixture in the reactor without lowering the temperature. In this case, the molar ratio of $H_2O/NMP$ measured by gas chromatography was 0.85.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Example 4

In step (a), sodium hydrosulfide (NaSH) and sodium hydroxide (NaOH) were mixed at an equivalence ratio of 1:1.05 to prepare sodium sulfide. At this time, 0.44 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 1.94.

In step (c), to obtain a mixed solution, 0.99 equivalents of para-dichlorobenzene (p-DCB) and 1.65 equivalents of N-methyl-2-pyrrolidone (NMP) were added to the residual mixture in the reactor without lowering the temperature. In this case, the molar ratio of $H_2O/NMP$ measured by gas chromatography was 0.68.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Example 5

In step (a), sodium hydrosulfide (NaSH) and sodium hydroxide (NaOH) were mixed at an equivalence ratio of 1:1.05 to prepare sodium sulfide. At this time, 0.44 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 205° C. and maintaining at 205° C. for 1 hour with stirring at 150 rpm to obtain a residual mixture. In this case, the molar ratio of $H_2O/S$ measured by gas chromatography was 1.75.

In step (c), to obtain a mixed solution, 0.99 equivalents of para-dichlorobenzene (p-DCB) and 2.00 equivalents of N-methyl-2-pyrrolidone (NMP) were added to the residual mixture in the reactor without lowering the temperature. In this case, the molar ratio of $H_2O/NMP$ measured by gas chromatography was 0.54.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Comparative Example 1

In step (a), 70% sodium hydrosulfide (NaSH) and sodium hydroxide (NaOH) were mixed at an equivalence ratio of 1:1.05 to prepare sodium sulfide. At this time, 0.33 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.69.

In step (c), to obtain a mixed solution, 1.08 equivalents of para-dichlorobenzene (p-DCB) and 1.65 equivalents of N-methyl-2-pyrrolidone (NMP) were added to the residual mixture in the reactor without lowering the temperature. In this case, the molar ratio of $H_2O/NMP$ measured by gas chromatography was 0.99.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Comparative Example 2

In step (a), 70% sodium hydrosulfide (NaSH) and sodium hydroxide (NaOH) were mixed at an equivalence ratio of 1:1.05 to prepare sodium sulfide. At this time, 0.33 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.56.

In step (c), to obtain a mixed solution, 0.99 equivalents of para-dichlorobenzene (p-DCB) and 1.35 equivalents of N-methyl-2-pyrrolidone (NMP) were added to the residual mixture in the reactor without lowering the temperature. In this case, the molar ratio of $H_2O/NMP$ measured by gas chromatography was 0.96.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Comparative Example 3

In step (a), 70% sodium hydrosulfide (NaSH) and sodium hydroxide (NaOH) were mixed at an equivalence ratio of 1:1.05 to prepare sodium sulfide. At this time, 0.44 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 205° C. and maintaining at 205° C. for 1 hour with stirring at 150 rpm to obtain a residual mixture. In this case, the molar ratio of $H_2O/S$ measured by gas chromatography 1.78.

In step (c), to obtain a mixed solution, 0.99 equivalents of para-dichlorobenzene (p-DCB) and 3.00 equivalents of N-methyl-2-pyrrolidone (NMP) were added to the residual mixture in the reactor without lowering the temperature. In this case, the molar ratio of $H_2O/NMP$ measured by gas chromatography was 0.42.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

The resultant was sequentially washed with a mixture of distilled water and the organic solvent and distilled water, and then filtered, but polyphenylene sulfide particles were not obtained.

Comparative Example 4

In step (a), 70% sodium hydrosulfide (NaSH) and sodium hydroxide (NaOH) were mixed at an equivalence ratio of 1:1.05 to prepare sodium sulfide. At this time, 0.33 equivalents of sodium acetate powder, 1.65 equivalents of N-methyl-2-pyrrolidone (NMP), and 4.72 equivalents of distilled water were added to a reactor.

In step (b), the mixture in the reactor was dehydrated by heating to 180° C. and maintaining at 180° C. for 1 hour with stirring at 150 rpm to obtain a residual mixture. In this case, the molar ratio of $H_2O/S$ measured by gas chromatography was 2.40.

In step (c), to obtain a mixed solution, 0.99 equivalents of para-dichlorobenzene (p-DCB) and 1.35 equivalents of N-methyl-2-pyrrolidone (NMP) were added to the residual mixture in the reactor without lowering the temperature. In this case, the molar ratio of $H_2O/NMP$ measured by gas chromatography was 0.91.

Thereafter, the mixed solution was heated to 230° C. and reacted for 2 hours; and heated to 250° C. and reacted for 2 hours. Then, 3 equivalents of distilled water were added to the mixed solution, followed by stirring for 20 minutes.

To obtain a polyphenylene sulfide, the following processes were sequentially performed. The resultant was sequentially washed with a mixture of distilled water and the organic solvent and distilled water, and filtered; washed with the organic solvent at 100° C. for 10 minutes, and filtered; washed with an 0.4% aqueous solution of acetic acid at 120° C., and filtered; and filtered using distilled water at 100° C. for 10 minutes.

Test Example

The physical properties of polyphenylene sulfides obtained according to Examples 1 to 5 and Comparative Examples 1 to 4 were measured using the following methods, and results are shown in Table 1.

Measurement Methods

Melt viscosity (Pa·s): Using an Advanced Rheometric Expansion System G2 (ARES-G2), each polyphenylene sulfide resin was placed on a flat plate, and the melt viscosity of each resin was measured at 300° C. using a frequency sweeping method while varying angular frequency from 0.1 to 100 rad/s.

Molecular weight: Based on the fact that molecular weight is proportional to the melt viscosity (MV) value, the molecular weight of a polymer was indirectly measured using a MV value of 0.1 rad/s.

Molecular weight=$10^{((LOG(\text{melt viscosity value})+12.20468)/3.48067)}$

Flexural strength (MPa) and tensile strength (MPa): To measure flexural strength and tensile strength, specimens for measuring flexural strength were prepared in an ISO FLEX BAR shape, and specimens for measuring tensile strength were prepared in an ASTM D638 shape. The flexural strength and tensile strength of the specimens were measured seven times using a Universal Testing Machine (UTM) (Zwick Co.), and the results were averaged after excluding the highest and lowest values.

TABLE 1

| Classification | Melt viscosity (Pa · s) | Molecular weight (g/mol) | Flexural strength (MPa) | Tensile strength (MPa) |
|---|---|---|---|---|
| Example 1 | 456.2 | 36,114.6 | 131.3 | 81.7 |
| Example 2 | 1063.1 | 46,053.3 | 114.0 | 78.9 |
| Example 3 | 380.5 | 34,282.4 | 121.3 | 81.6 |
| Example 4 | 2076.1 | 55,817.0 | 126.7 | 76.8 |
| Example 5 | 4005.2 | 67,414.8 | 128.5 | 75.4 |
| Comparative Example 1 | 47.7 | 18,873.5 | 73.4 | 57.7 |
| Comparative Example 2 | 51.6 | 19,303.8 | 84.8 | 60.8 |
| Comparative Example 3 | Not measurable | Not measurable | Not measurable | Not measurable |
| Comparative Example 4 | 112.9 | 24,178.3 | 101.1 | 61.3 |

As shown in Table 1, in the cases of Examples 1 to 5, it can be confirmed that melt viscosity and molecular weight and mechanical properties such as flexural strength and tensile strength are excellent.

In particular, in the cases of Examples 2, 4, and 5, it can be confirmed that melt viscosity rapidly increases within a range of 1,000 to 4,010 Pa·s.

On the other hand, in the cases of Comparative Examples 1, 2, and 4 using dehydration conditions outside the range specified in the present invention, i.e., dehydration conditions in which the molar ratio of $H_2O$/organic solvent exceeds 0.85, melt viscosity is rapidly reduced to 150 Pa·s or less, resulting in a molecular weight of 30,000 g/mol or less. This phenomenon occurs when the amount of water in a polymerization reactor is excessive.

In addition, in the case of Comparative Example 3 using dehydration conditions outside the range specified in the present invention, i.e., dehydration conditions in which the molar ratio of $H_2O$/organic solvent is less than 0.50, polyphenylene sulfide particles are not obtained. This phenomenon occurs when the amount of water in a polymerization reactor is small.

The FIGURE is a scatter plot showing the relationship between the molar ratio of $H_2O$/organic solvent in step (c) and melt viscosity (MV, Angular frequency 0.1 rad/s, 300, Pa·s), which shows the difference between the polyphenylene sulfide prepared by the method of the present invention and a polyphenylene sulfide prepared by a conventional method.

From the results shown in the FIGURE, it can be confirmed that, in the cases of Examples 1 to 5, melt viscosity is obviously proportional to the molar ratio of $H_2O$/organic solvent, whereas in the cases of Comparative Examples 1, 2, and 4, there is no correlation between melt viscosity and the molar ratio of $H_2O$/organic solvent. According to the method of the present invention, the dehydration conditions are controlled and the ratio of an organic phase to an aqueous phase is appropriately controlled. As a result, such results can be obtained.

Therefore, according to the method of preparing a polyphenylene sulfide, and the high-viscosity polyphenylene sulfide prepared using the method, when a polyphenylene sulfide is prepared, dehydration conditions are controlled to adjust the ratio of an organic phase to an aqueous phase, so that high viscosity may be effectively realized without adversely affecting a reaction or physical properties during preparation of the polyphenylene sulfide.

The invention claimed is:

1. A method of preparing a polyphenylene sulfide, comprising:
   (a) a step of mixing a sulfur source, an alkali metal hydroxide, a polymerization agent, an organic solvent, and water to obtain an initial mixture;
   (b) a step of heating the initial mixture while stirring to obtain a residual mixture; and
   (c) a step of adding a dihalogenated aromatic compound and an organic solvent to the residual mixture to obtain a mixed solution, and polymerizing the mixed solution,
   wherein in step (b), a molar ratio of water to sulfur ($H_2O$/S) in the residual mixture is 2.14 to 2.5, and
   wherein in step (c), a molar ratio of water to the organic solvent ($H_2O$/organic solvent) in the mixed solution is 0.5 to 0.85.

2. The method according to claim 1, wherein the sulfur source is one or more selected from the group consisting of sodium hydrogen sulfate, sodium sulfide, and potassium sulfide.

3. The method according to claim 1, wherein the polymerization agent is one or more selected from the group consisting of an organic acid metal salt, an alkali metal chloride, an organic sulfonate, and an alkali metal sulfate.

4. The method according to claim 1, wherein the organic solvent is one or more selected from the group consisting of an alcohol, an alkylene oxide, N-methylpyrrolidone, and a polyhydric alcohol.

5. The method according to claim 1, wherein, in step (b), the mixture is heated to a temperature of 130 to 210° C. and stirred to reduce an amount of water.

6. The method according to claim 1, wherein the dihalogenated aromatic compound is one or more selected from the group consisting of polyhalogenated aromatic compounds consisting of p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene.

7. The method according to claim 1, wherein an equivalence ratio (S/DH) of the sulfur source (S) in step (a) to the dihalogenated aromatic compound (DH) in step (c) is 0.80 to 1.30.

8. The method according to claim 1, wherein an equivalence ratio (WM/S) of the polymerization agent (WM) to the sulfur source (S) in step (a) is 0.05 to 1.0.

9. The method according to claim 1, wherein, in step (c), the polymerization is performed by heating the mixed solution to a temperature of 200 to 280° C. and stirring the mixed solution.

* * * * *